United States Patent [19]

Frisch

[11] Patent Number: 5,750,028

[45] Date of Patent: May 12, 1998

[54] BIOMASS SEPARATION APPARATUS AND METHOD WITH MEDIA RETURN

[75] Inventor: Sam Frisch, Manalapan, N.J.

[73] Assignee: Envirogen, Inc., Lawrenceville, N.J.

[21] Appl. No.: 715,199

[22] Filed: Sep. 18, 1996

[51] Int. Cl.⁶ ............................................. C02F 3/08
[52] U.S. Cl. .......................... 210/618; 210/661; 210/792; 210/151; 210/189; 210/274
[58] Field of Search .......................... 210/617, 618, 210/661, 670, 675, 792, 150, 151, 189, 274

[56] References Cited

U.S. PATENT DOCUMENTS

| | | |
|---|---|---|
| 2,146,326 | 2/1939 | Bergius et al. . |
| 3,705,082 | 12/1972 | Hondermarck et al. . |
| 3,717,552 | 2/1973 | Hondermarch et al. . |
| 3,855,120 | 12/1974 | Garbo .................... 210/618 |
| 3,910,826 | 10/1975 | Kataoka . |
| 4,026,674 | 5/1977 | McDonald ................ 210/189 |
| 4,177,144 | 12/1979 | Hickey et al. . |
| 4,250,033 | 2/1981 | Hickey et al. . |
| 4,357,424 | 11/1982 | Bu'Lock . |
| 4,545,909 | 10/1985 | Atkinson et al. ............ 210/618 |
| 4,561,974 | 12/1985 | Bernard et al. . |
| 4,589,927 | 5/1986 | Allen et al. ................ 210/618 |
| 4,681,685 | 7/1987 | Sutton et al. . |
| 4,707,252 | 11/1987 | Durot et al. ............... 210/151 |
| 4,708,936 | 11/1987 | Kulla et al. . |
| 4,882,068 | 11/1989 | Blom . |
| 4,892,818 | 1/1990 | Ramp . |
| 4,904,600 | 2/1990 | Ramp . |
| 4,954,259 | 9/1990 | Elmaleh et al. ............. 210/617 |
| 4,959,084 | 9/1990 | Wolverton et al. . |
| 5,166,072 | 11/1992 | Krauling et al. . |
| 5,173,194 | 12/1992 | Hering, Jr. . |
| 5,260,216 | 11/1993 | Hirose et al. . |
| 5,277,829 | 1/1994 | Ward ...................... 210/189 |
| 5,316,945 | 5/1994 | Minuth . |
| 5,342,781 | 8/1994 | Su . |
| 5,487,829 | 1/1996 | Safferman et al. .......... 210/618 |
| 5,494,574 | 2/1996 | Unterman et al. . |
| 5,573,663 | 11/1996 | Junius et al. .............. 210/189 |
| 5,573,671 | 11/1996 | Klein ..................... 210/617 |

*Primary Examiner*—Peter A. Hruskoci
*Assistant Examiner*—Theodore M. Green
*Attorney, Agent, or Firm*—Miller & Christenbury

[57] ABSTRACT

A separator is provided for use with a fluidized-bed bioreactor. A lift draws a slurry of liquid, media and biomass from the fluidized bed. A biomass discharge is connected to the lift for discharging excess biomass. A media discharge, also connected to the lift, discharges media from the slurry and returns the media to the fluidized bed by means of a media return assembly.

20 Claims, 5 Drawing Sheets

BIOMASS SEPARATION APPARATUS AND METHOD WITH MEDIA RETURN

FIELD OF THE INVENTION

The present invention relates to a fluidized-bed bioreactor, particularly to a bioreactor for separating contaminants from liquids and degrading the separated contaminants.

BACKGROUND OF THE INVENTION

It is increasingly important in view of stricter environmental regulations to provide systems to remove contaminants from liquids such as hazardous or contaminated effluents. The development of fluidized-bed bioreactors represents a significant step toward the efficient removal of such contaminants.

However, conventional fluidized-bed bioreactors suffer from operational drawbacks in that the media or carriers may be subject to excessive buildup of biologically active materials (or "biomass"), thereby causing poor flow distribution, excessive media and/or biomass carryover, crusting, clogging and the like. The result is detrimental to system performance.

Attempts have been made in the past to overcome this long-standing problem. U.S. Pat. Nos. 4,892,818 and 4,904,600, both to Floyd Ramp, describe a fluidized bed bioreactor with recirculating wash liquid. Wash liquid is forced from the bioreactor to a separator for contaminant removal. The wash liquid is recycled into the bioreactor by a pump. A retaining screen provided at the wash liquid outlet prevents circulation of the packing material.

U.S. Pat. No. 4,545,909, issued to Bernard Atkinson et al. describes a reactor for treating sewage. Media bodies are delivered to a straining device and separated bodies are transported to a machine which separates biomass. The separation machine separates biomass by compression, intense vibration or other mechanical methods. Alternatively, a chemical or biological separation method, such as extended aeration, is used.

U.S. Pat. No. 5,494,574, issued to Ronald Unterman et al. discloses an improved packed-bed bioreactor that cleans the packing to remove buildup materials. Packing material is circulated from an outlet at the bottom of the packed bed to an inlet near the top of the packed bed. A motor operates a conveyor to cause the packing material to circulate to the top of the packed bed. Waste material such as dead microorganisms, degradation products and the like flow to the bottom of the conveyor and out through a waste conduit.

There remains a need in the industry for an effective system for separating accumulated biomass from the slurry of a fluidized-bed bioreactor.

OBJECTS OF THE INVENTION

It is accordingly an object of the invention to provide an improved separator and method for use with fluidized-bed bioreactors.

It is another object of the invention to provide a system for separating biomass from a slurry of liquid, media and biomass.

Other objects and advantages of the invention will become apparent to those skilled in the art, from the drawings, the detailed description of preferred embodiments and the appended claims.

SUMMARY OF THE INVENTION

One aspect of the invention provides a separator for use with a bioreactor having a reaction chamber containing a slurry of liquid, media and biomass. A lift is provided to urge the slurry to the separator from the fluidized bed. A biomass discharge, a media discharge and a media return line are connected to the lift. Means is provided to permit flow of media into the media return line from the media discharge. Also, means is provided to permit flow of an influent into the media return line. A cleaning fluid inlet is optionally provided as well.

A lift fluid such as gas is preferably used to urge a portion of slurry through the lift to the separator. The separator is preferably positioned outside the reaction chamber, but is alternatively positioned within the reaction chamber.

In operation, biomass is separated from a slurry of liquid, media and biomass through the biomass discharge. Media from the slurry is discharged through the media discharge. During a cleaning stage, the media enters the media return line. During a flushing stage, additional media is prevented from entering the media return line, and influent is introduced to flush media in the media return line to the fluidized bed.

DETAILED DESCRIPTION OF THE INVENTION

Figure 1:
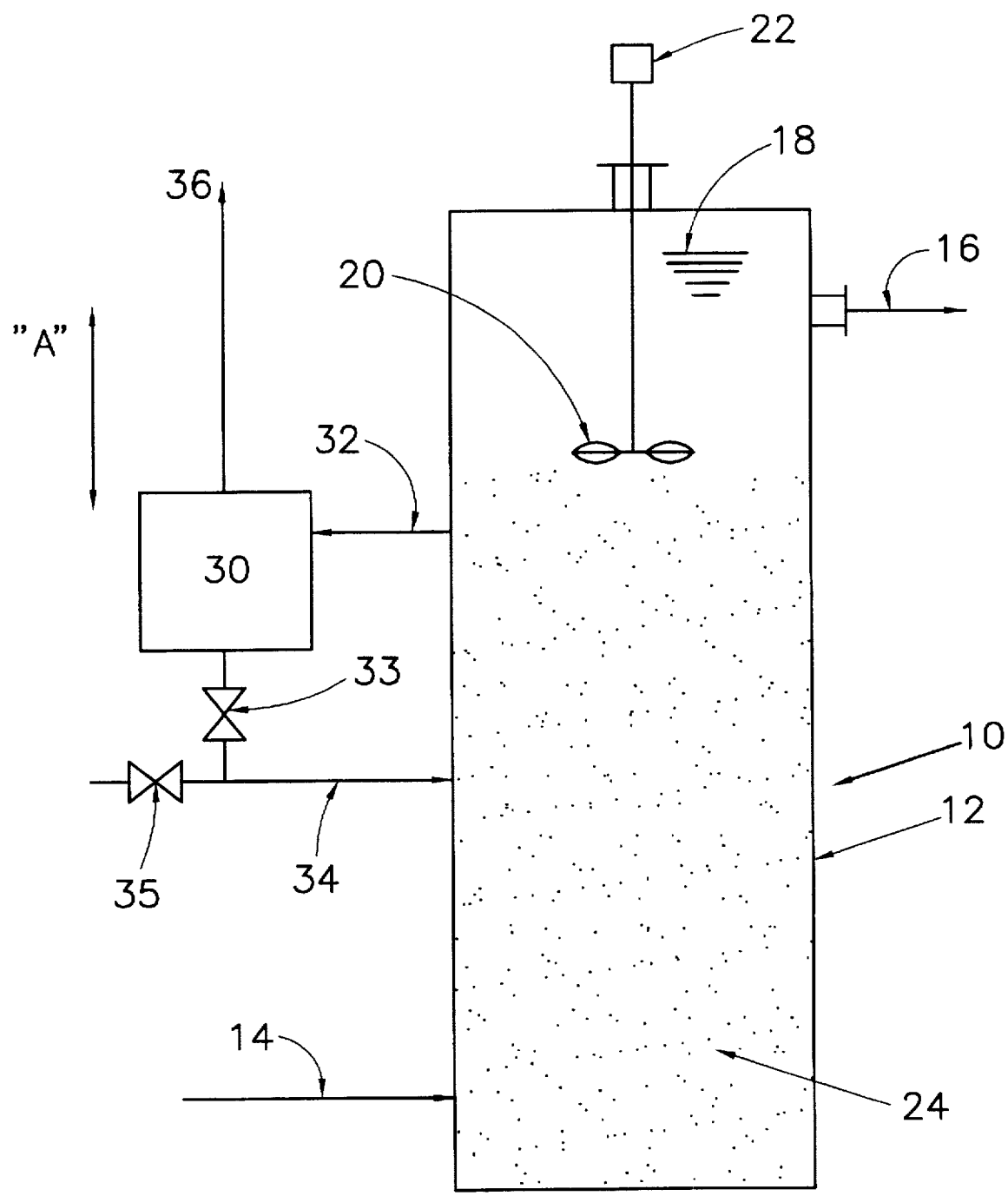
FIG. 1 is a schematic view of an embodiment of a fluidized-bed bioreactor including an external separator embodiment according to this invention.

It will be appreciated that the following description is intended to refer to specific aspects of the invention selected for illustration in the drawings and is not intended to define or limit the invention other than in the appended claims.

Figure 2:
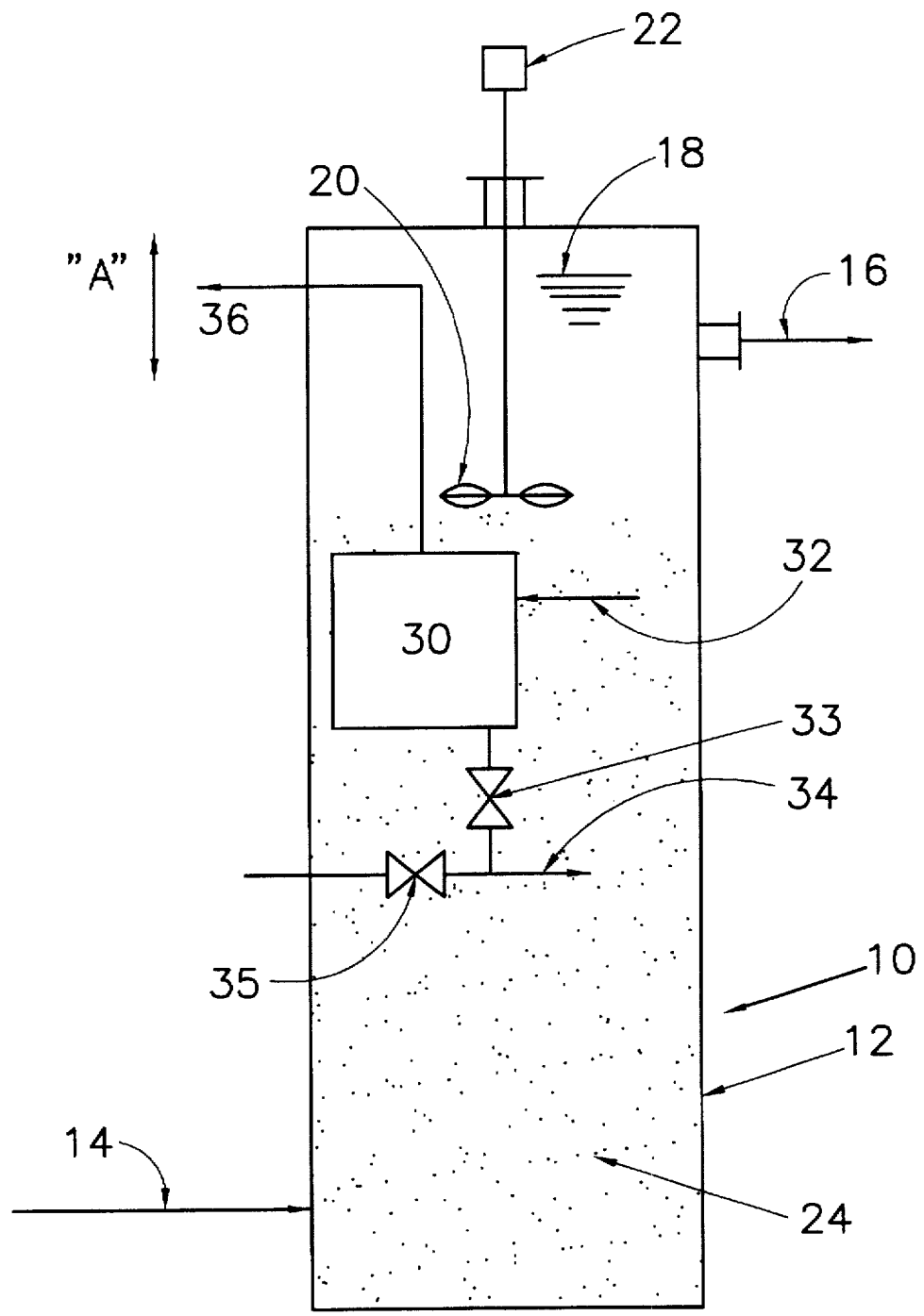
FIG. 2 is a schematic view of an embodiment of a fluidized-bed bioreactor including an internal separator embodiment according to this invention.
Figure 3:
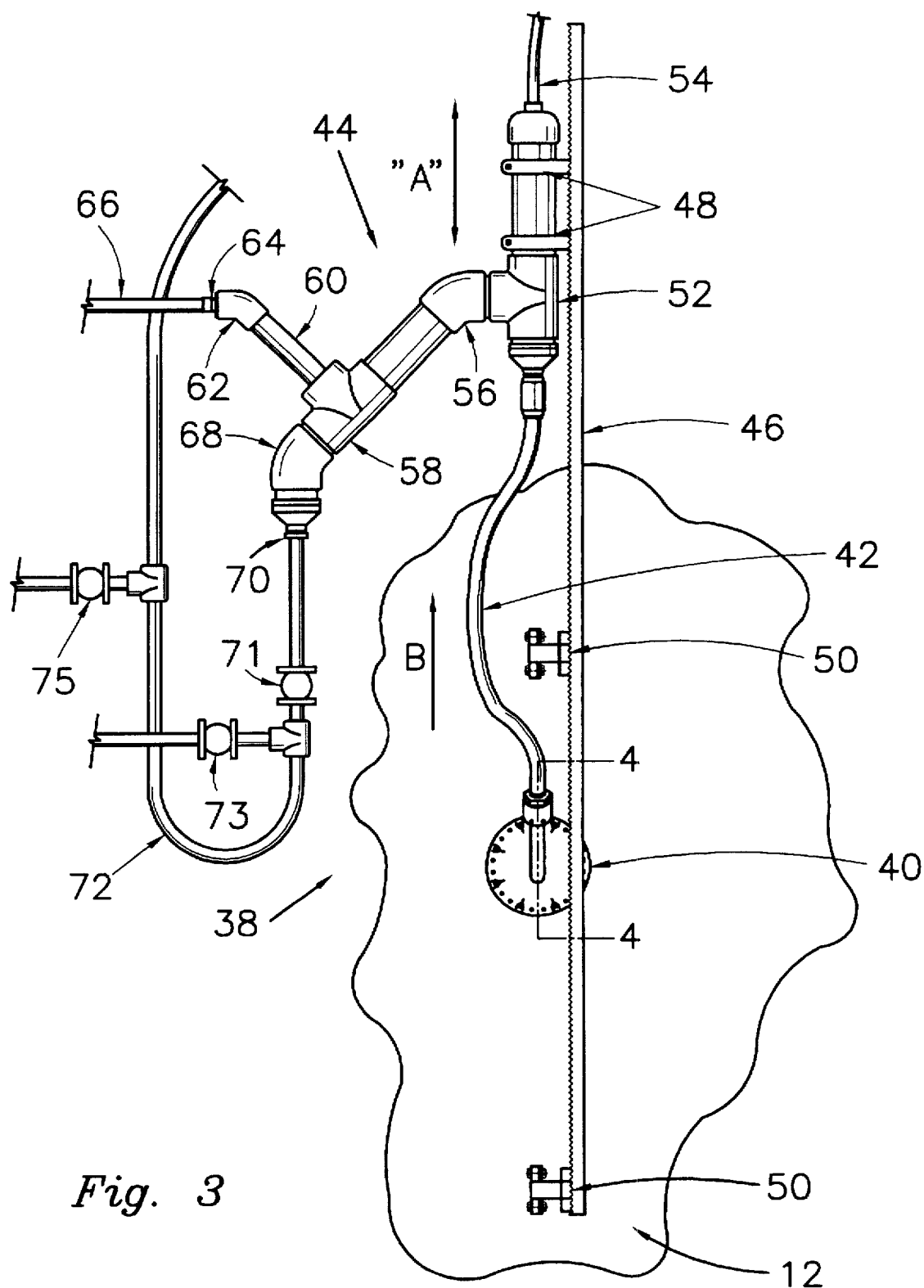
FIG. 3 is a side view of an embodiment of a separator according to this invention.
Figure 4:
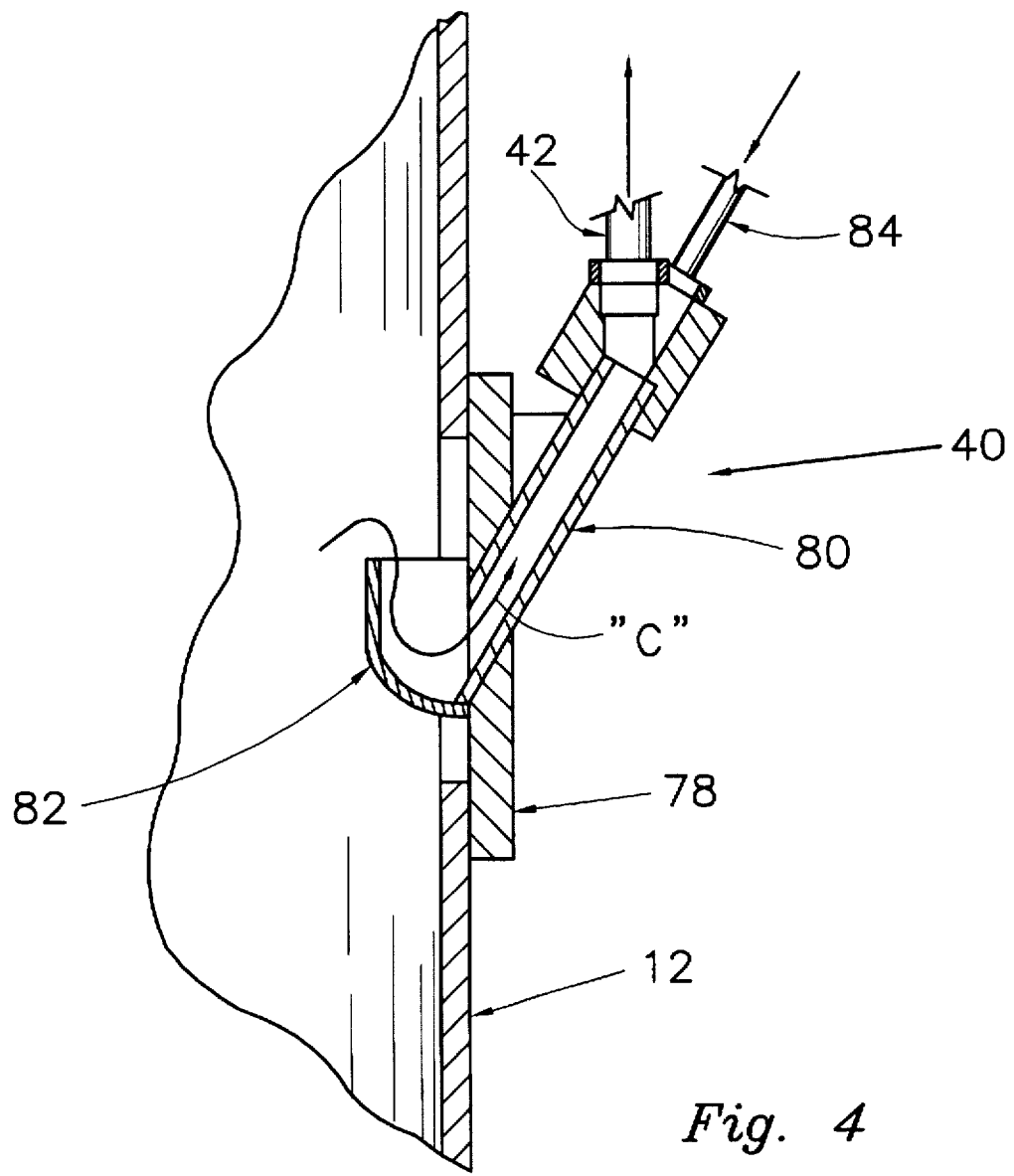
FIG. 4 is a cross-sectional side view of a detail of the separator embodiment shown in FIG. 3.
Figure 5:
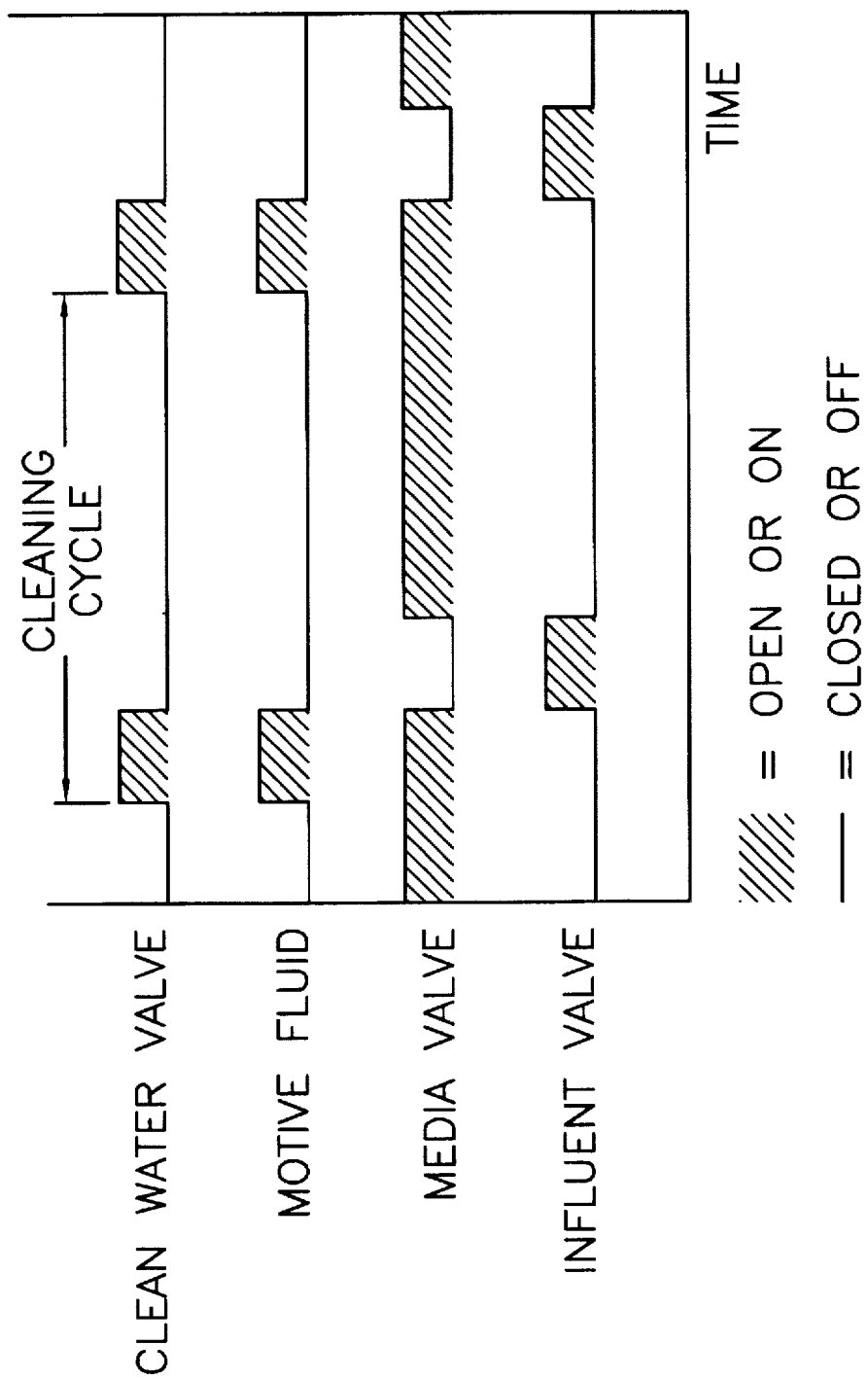
FIG. 5 illustrates an embodiment of a cleaning cycle, graphically represented, that can be used to perform a method according to the invention.

Turning now to the figures in general, several embodiments of a separator in accordance with aspects of the invention are shown for the purpose of illustration. FIGS. 1 and 2 illustrate embodiments of a bioreactor system that can utilize a separator according to this invention. The embodiment shown in FIG. 1 includes an external separator and the embodiment shown in FIG. 2 includes an internal separator. FIGS. 3 and 4 illustrate details of one possible embodiment of the system illustrated schematically in FIG. 1. FIG. 5 illustrates an embodiment of a preferred cleaning cycle.

Referring to FIG. 1, the numeral "10" generally designates a fluidized-bed bioreactor adapted for removing contaminants from liquids. In the embodiment selected for illustration in FIG. 1, bioreactor 10 includes a reaction chamber 12 adapted to contain a fluidized reactor bed. An inlet 14 is provided for the introduction of a contaminated waste liquid to be treated in bioreactor 10. Representative contaminants include water containing petroleum hydrocarbons, benzene/toluene/ethylbenzene/xylenes (BTEX) and trichloroethylene (TCE), although other contaminants are possible, either alone or in combination.

An outlet 16 is provided for the removal of treated effluent or other liquid. The liquid level in reaction chamber 12 extends upwardly to an upper level 18. A mixer or agitator 20 is rotated by means of a motor 22 in order to control the height of the fluidized bed.

The fluidized bed comprises a slurry 24 including liquid, a growth media or packing material (such as carbon granules, for example), and biomass. Many suitable forms of media are known in the art. The media is supplied with microorganisms such as Pseudomonas, Actinomyces, or other bacteria, fungi or molds, for example, which can degrade contaminants carried by the liquid introduced through the inlet. Upon passing into contact with the microorganisms, contaminants within the contaminated liquid are degraded. Degradation of the contaminant occurs by the usual mechanism of the particular microorganisms employed. As the quantity of biomass increases during the bioreaction process, it becomes beneficial to remove some of the biomass that can be considered excess to the bioreaction system. In most instances, the excess biomass includes dead cell mass and residual nutrients and carrier fluid. Frequently, no special disposal procedures or apparatus is required.

In order to remove excess biomass from slurry 24, a separator 30 is provided. As shown in FIG. 1, separator 30 is optionally positioned outside of reaction chamber 12. However, as shown in FIG. 2, separator 30 is alternatively positioned within reaction chamber 12, depending upon design choices and the specific application with which the bioreactor is used.

Whether separator 30 is positioned outside or inside the reaction chamber 12, a separator inlet 32 is provided for the flow of slurry 24 into separator 30 from the fluidized bed. Separator inlet 32 is optionally a lift, as will be described later. Also provided is a media return 34 through which media returns to the fluidized bed after passing through separator 30. Media return 34 is optionally a media discharge port, as will be described later.

Separator 30 also includes a biomass discharge 36 through which excess biomass removed from slurry 24 is removed from the system. As shown in FIGS. 1 and 2, separator 30 and/or biomass discharge 36 is preferably adjustable in position or height in the direction generally designated "A". This preferred feature, as well as various benefits thereof, is described in detail in co-pending application Ser. No. 08/715,561, incorporated herein by reference.

Referring to FIGS. 3 and 4, a particular embodiment of an external separator (such as the one illustrated schematically in FIG. 1, for example) is shown.

FIG. 3 shows an external separator assembly 38 that is connected to the outside of a reaction chamber such as reaction chamber 12. Separator assembly 38 includes a supply or lift assembly 40, details of which are provided in the cross-sectional view presented in FIG. 4. Supply or lift assembly 40 is attached to the wall of a reaction chamber by means of a flange 78. Connected to flange 78 is an outlet line 80 and a baffle 82 through which slurry (such as slurry 24 shown in FIGS. 1 and 2) flows from within the reaction chamber in the direction designated "C." A motive fluid supply line 84 is provided for the introduction of motive fluid—preferably a motive gas such as air is used, but a motive liquid is contemplated as well.

Again referring to FIG. 3, the motive fluid, when in gaseous form, is introduced via supply line 84 (FIG. 4) and creates bubbles that urge the slurry in slugs upwardly through a lift line or passage 42 in the general direction labeled "B". Passage 42 extends upwardly for connection to a separator body 44. Separator body 44 is attached to a channel 46 in a manner that permits height adjustability in the direction "A". Separator body 44 is attached to channel 46 by means of clamps 48. In turn, channel 46 is attached to the reaction chamber by means of brackets 50. Accordingly, adjustment to the height of separator body 44 can be made easily by moving separator body 44 upwardly or downwardly along channel 46 and, when a desired height is established, fixing separator body 44 with respect to channel 46.

Components of the separator body embodiment illustrated in FIG. 3 will now be described. A tee 52 is provided to receive slurry from the passage 42. Motive fluid such as gas separates from the slurry in a pipe section (not labeled) above tee 52, and such separated fluid is discharged upwardly through vent line 54. The slurry, which arrives in separator body 44 in slugs when motive gas is used, travels from tee 52, through an elbow 56, and arrives at a second tee 58. In the vicinity of tee 58, separation occurs between excess biomass in the slurry and media in the slurry. The separation occurs mostly due to a difference between the density of the biomass and the density of the media. Biomass tends to move upwardly by virtue of a controlled upward velocity, while the media tends to sink.

A pipe 60 extends upwardly at an angle from tee 58 and terminates at an elbow 62 to which a biomass discharge opening 64 and biomass line 66 are connected. As previously described, biomass discharge 64 is most preferably adjusted to a height that provides a desired biomass outflow rate. The length of pipe 60 is optionally adjustable as well to accomplish desired outflow rate. Details are provided in co-pending application Ser. No. 08/715,561.

Downstream from tee 58 is provided an elbow 68 which terminates at a media discharge 70. Out through media discharge 70 flows the media that remains in the extracted slurry as well as the majority of liquid from the slurry (it is contemplated that some amount of liquid will be discharged through biomass discharge 64). A media return line 72 is connected to media discharge 70 through which media returns to the fluidized bed by means of a valved return assembly.

The valve return assembly illustrated in FIG. 3 is beneficial for urging media to the fluidized bed. An alternative return assembly is described in co-pending application Ser. No. 08/715,561, which also describes other possible separator details and is therefore incorporated herein by reference.

Referring still to FIG. 3, the preferred valve return assembly includes a media valve 71 positioned downstream from media discharge 70. Media valve 71 is normally open to permit the flow of media from media discharge 70 into media return line 72. When closed, media valve 71 prevents such flow and also prevents the flow of media back upstream through the discharge from the return line. Although a valve is preferred, any known component for controlling flow is optionally substituted. For example, a pump may be used as can any other equivalent device. If a valve is used, any type of valve is optionally selected. Also, whatever device is selected, it is optionally adapted for on/off control or for proportional or throttled control.

Preferably downstream from media valve 71 along media return line 72 is a media return motive fluid valve 73. Media return motive fluid valve 73 is connected to a source of pressurized fluid, such as a liquid or gas (not shown) and is normally closed to prevent the flow of such influent into media return line 72. When opened, media return motive fluid valve 73 introduces pressurized fluid into the return line in order to urge media to the fluidized bed through the return line. The pressurized fluid can be selected from any available liquid or gas, but is most preferably liquid that has already been treated in the bioreactor, liquid yet-to-be treated, or some mixture thereof. Alternatively, water, nutrients, or other materials are used. Also, although the pressurized fluid is most preferably introduced through a valve, other means are contemplated as described above with respect to the media valve.

Preferably downstream along media return line 72 is an optional clean water valve 75. Clean water valve 75 is connected to a source of clean water or another suitable cleaning medium (not shown). Valve 75 is normally closed to prevent the flow of cleaning water into media return line 72. When opened, valve 75 introduces cleaning medium such as water into the return line in order to clean the media, preferably in counter-current flow, in the return line.

The valves 71, 73 and 75 may be separate valves or any alternative or equivalent means of controlling flow. For example, valves 71, 73 and 75 are optionally combined into a three-way valve or into one or more multiport valves, in any combination. For example, there may be a benefit achieved by combining influent valve 73 and cleaning medium valve 75 into a two-way valve or multiport valve, maintaining media valve 71 as a separate component. Other combinations are contemplated.

The operation of a separator according to this invention will now be described with general reference to the figures. A motive fluid such as gas or air is injected to urge a portion of slurry through a lift passage. Biomass is discharged through a biomass discharge that is preferably maintained at a height above the height of liquid in the reaction chamber. Media from the slurry is discharged through a media discharge for return to the fluidized bed by means of a media return line.

The separation and media return process according to this invention is preferably performed in periodic cycles, referred to as cleaning cycles herein. Each cleaning cycle preferably includes a cleaning stage during which slurry is delivered to the separator from the fluidized bed and optional cleaning medium is introduced. Each cleaning cycle also preferably includes a flushing stage during which media collected in the media return line is returned to the fluidized bed.

Referring now to FIG. 5, an embodiment of a cleaning cycle according to this invention is illustrated graphically. This figure illustrates a preferred cycle as time progresses to the right along the abscissa. It also illustrates the relative on/off or opened/closed positions of an optional clean water valve (such as valve 75), a motive fluid supply (such as at supply line 84), a media valve (such as valve 71), and a media return motive fluid valve (such as valve 73).

The clean water valve is preferably opened at the start of the cycle to begin a cleaning stage as motive fluid is introduced. During this cleaning stage, slurry is lifted to the separator from the fluidized bed, biomass is discharged through the biomass discharge, media is discharged through the open media valve into the media return line, and media is cleaned in the return line by the introduced water in counter-current flow.

After the cleaning stage, the motive fluid is cut off, the clean water valve is closed, the media valve is closed, and the media return motive fluid valve is opened to urge the cleaned media in a downstream direction back to the bioreactor through the return line. The cleaning cycle is repeated in periodic intervals or on command as needed.

Many modifications to the particular embodiments shown for illustration in the drawings can be made without departing from the spirit or the scope of this invention. For example, the separator assembly can be located within the reaction chamber or outside the reaction chamber. Also, although the biomass discharge is preferably positioned at a height greater than that of the liquid in the reaction chamber, the height of the biomass discharge is preferably adjustable upwardly or downwardly. Other possible modifications are described in co-pending application Ser. No. 08/715,566 and are incorporated herein by reference. Many additional modifications are contemplated.

In any embodiment or modification thereof, a separator and method according to this invention provides significant benefits. Specifically, it permits the separation-out of excess biomass that often accumulates during a continuous fluidized-bed bioreaction. Without removing such excess biomass, the performance of the bioreaction system can otherwise be diminished. Accordingly, the separator and method according to this invention provide substantial improvements to the effectiveness of fluidized-bed bioreactors.

Although this invention has been described in connection with specific forms thereof, it will be appreciated that a wide array of equivalents may be substituted for the specific elements shown and described herein and that a wide array of equivalents may be substituted for the apparatus and structure described herein without departing from the spirit of this invention as described in the appended claims.

What is claimed is:

1. A separator for use with a bioreactor having a reaction chamber for containing a fluidized bed comprising a slurry of liquid, media and biomass, said separator being adapted to discharge media from said slurry and return discharged media to said fluidized bed, said separator comprising:

a separator body for separating liquid, media and biomass and capable of discharging said biomass;

a media discharge for flow of media from said separator body, said media discharge being connected to a return passage for flow of said media from said media discharge and toward said fluidized bed;

means connected adjacent to said separator body for urging a portion of said slurry from said fluidized bed and toward said separator body;

means for selectively permitting or preventing flow of media into said return passage from said media discharge; and means for selectively permitting or preventing flow of a transport fluid into said return passage;

wherein said media flow means permits said flow of media into said return passage from said media discharge, and said transport fluid flow means prevents said flow of said transport fluid into said return passage, as said slurry means urges slurry from said fluidized bed toward said media discharge; and wherein said media flow means prevents said flow of media into said return passage from said media discharge, and said transport fluid flow means permits said flow of transport fluid into said return passage, to urge media contained within said return passage through said return passage toward said fluidized bed.

2. The separator defined in claim 1, wherein said media flow means comprise a media valve having an open position for permitting media flow and a closed position for preventing media flow.

3. The separator defined in claim 1, wherein said means for urging comprises an inlet for lift fluid, wherein said lift fluid is introduced through said inlet to urge said portion of said slurry from said fluidized bed.

4. The separator defined in claim 3, wherein said inlet for said lift fluid is a gas inlet for introducing motive gas, thereby producing gas bubbles to urge said portion of said slurry from said fluidized bed.

5. The separator defined in claim 1, wherein said separator is positioned substantially outside of said reaction chamber.

6. The separator defined in claim 1, wherein said separator is positioned substantially within an interior of said reaction chamber.

7. The separator defined in claim 1, wherein said transport fluid flow means comprises a transport fluid valve having an open portion for permitting transport fluid flow and a closed position for preventing transport fluid flow.

8. A fluidized-bed bioreactor for removing contaminants from a liquid, said bioreactor comprising:

a reaction chamber for containing a fluidized bed comprising a slurry of liquid, media and biomass;

a separator for removing biomass from said slurry, said separator comprising a lift connected for flow of slurry into said lift from said fluidized bed, a biomass discharge connected to said lift for flow of biomass from said slurry urged through said lift, a media discharge connected to said lift for flow of media from said slurry urged through said lift, and a return passage connected to said media discharge for flow of media from said media discharge and toward said fluidized bed; and a valved return comprising a media valve connected adjacent to said media discharge and having an opened position for permitting flow of media into said return passage from said media discharge and a closed position for preventing flow of media into said return passage from said media discharge, said valved return further comprising a return valve connected adjacent to said return passage and having an opened position for permitting flow of a pressurized fluid into said return passage and a closed position for preventing flow of said pressurized fluid into said return passage;

wherein said media valve is in said opened position and said return valve is in said closed position as said slurry is urged by said lift from said fluidized bed; and wherein said media valve is in said closed position and said return valve is in said opened position to urge media within said return passage through said return passage toward said fluidized bed.

9. The bioreactor defined in claim 8, wherein said return passage is connected for flow of said media into a portion of said reaction chamber below a top of said fluidized bed.

10. The bioreactor defined in claim 9, wherein the position of said biomass discharge is maintained at a height above the height of liquid in said reaction chamber.

11. The bioreactor defined in claim 8, wherein said lift comprises an inlet for lift fluid, wherein said lift fluid is introduced into said lift through said inlet to urge a portion of said slurry through said lift.

12. The bioreactor defined in claim 11, wherein said inlet for said lift fluid is a gas inlet for introducing motive gas, thereby producing gas bubbles to urge said portion of said slurry through said lift.

13. The bioreactor defined in claim 8, wherein said separator is positioned substantially outside of said reaction chamber.

14. The bioreactor defined in claim 8, wherein said separator is positioned substantially within an interior of said reaction chamber.

15. In a method for separating biomass from a fluidized bed of a bioreactor comprising a reaction chamber for containing a slurry of liquid, media and biomass; means for urging flow of slurry from said fluidized bed; a biomass discharge; a media discharge; a return passage for flow of discharged media toward said fluidized bed; means permitting or preventing flow of media from said media discharge into said return passage; and means permitting or preventing flow of a transport fluid into said return passage, the steps comprising:

(a) urging a portion of said slurry from said fluidized bed;

(b) discharging biomass through said biomass discharge from said slurry urged from said fluidized bed;

(c) discharging media through said media discharge and into said return passage from said slurry urged from said fluidized bed while preventing flow of said transport fluid into said return passage;

(d) causing flow of said transport fluid into said return passage while preventing flow of media from said media discharge into said return passage; and (e) returning media discharged through said media discharge into said return passage, under the influence of said transport fluid introduced into said return passage, through said return passage and toward said fluidized bed.

16. The method defined in claim 15, wherein said urging step comprises introducing a lift fluid.

17. The method defined in claim 16, wherein said urging step further comprises introducing a gas and producing gas bubbles to urge a portion of said slurry upwardly from said fluidized bed.

18. The method defined in claim 15, said method further comprising the step of introducing into said return passage a cleaning fluid through a cleaning fluid inlet for contact with media in said return passage.

19. The method defined in claim 18, wherein said introducing step is performed concurrently with said urging step.

20. A method for separating biomass from a slurry of liquid, media and biomass contained in a fluidized bed of a bioreactor and returning media separated from said slurry to said fluidized bed, said method comprising the steps of:

(a) in a cleaning stage, urging a portion of said slurry from said fluidized bed to a separator, discharging biomass from said portion of said slurry through a biomass discharge, and discharging media from said portion of said slurry through a media discharge and into a media return passage; and (b) in a flushing stage, preventing flow of media from said media discharge into said media return passage, introducing a fluid into said media return passage, and causing said fluid to urge said media in said media return passage through said media return passage and toward said fluidized bed.

* * * * *